Aug. 9, 1949.                F. F. CALLAN                2,478,653
                       AUXILIARY WHEEL FOR VEHICLES
Filed Nov. 10, 1947                                   2 Sheets-Sheet 1
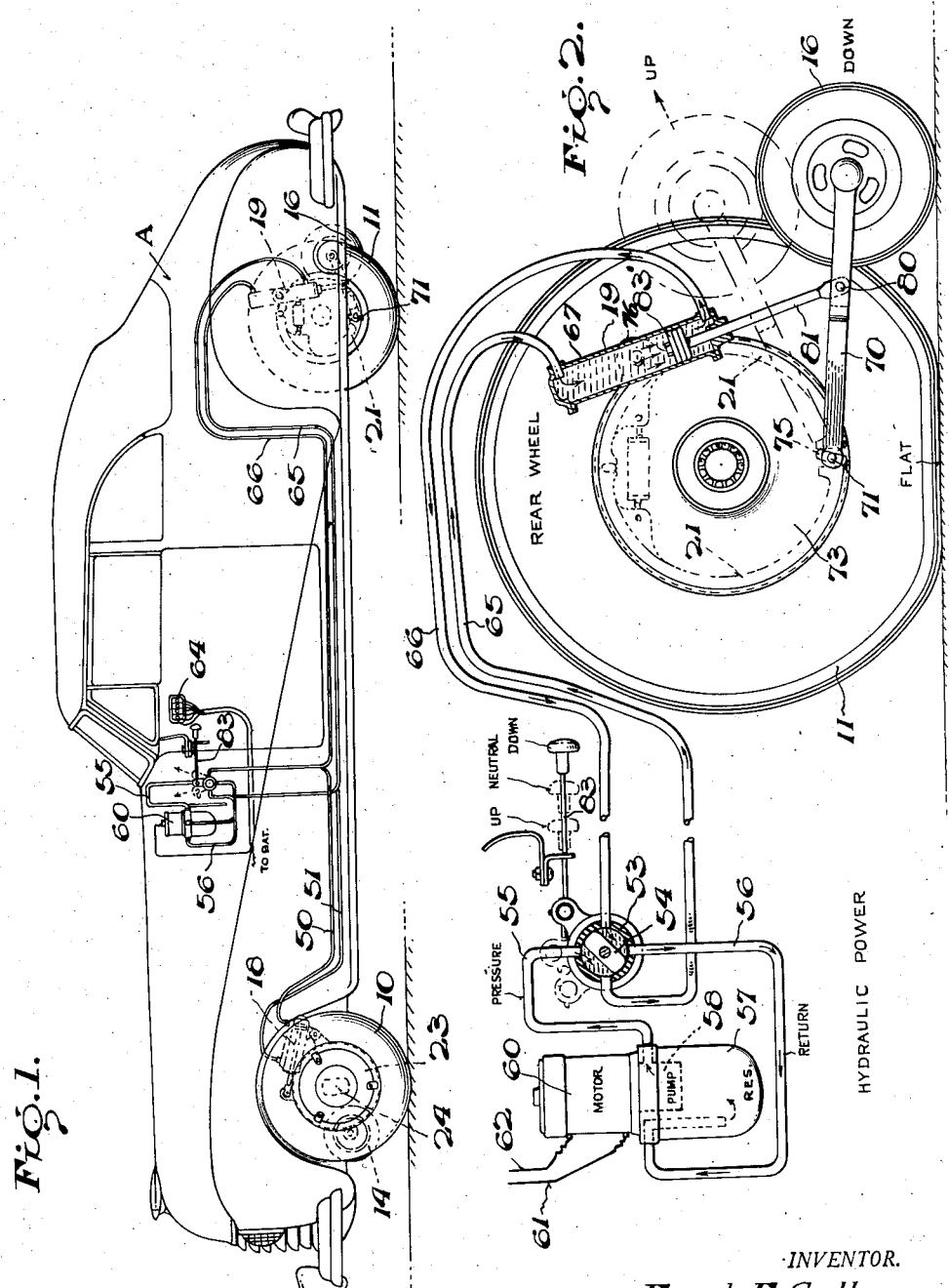
INVENTOR.
Frank F. Callan
BY
Herbert M. Birch
Attorney

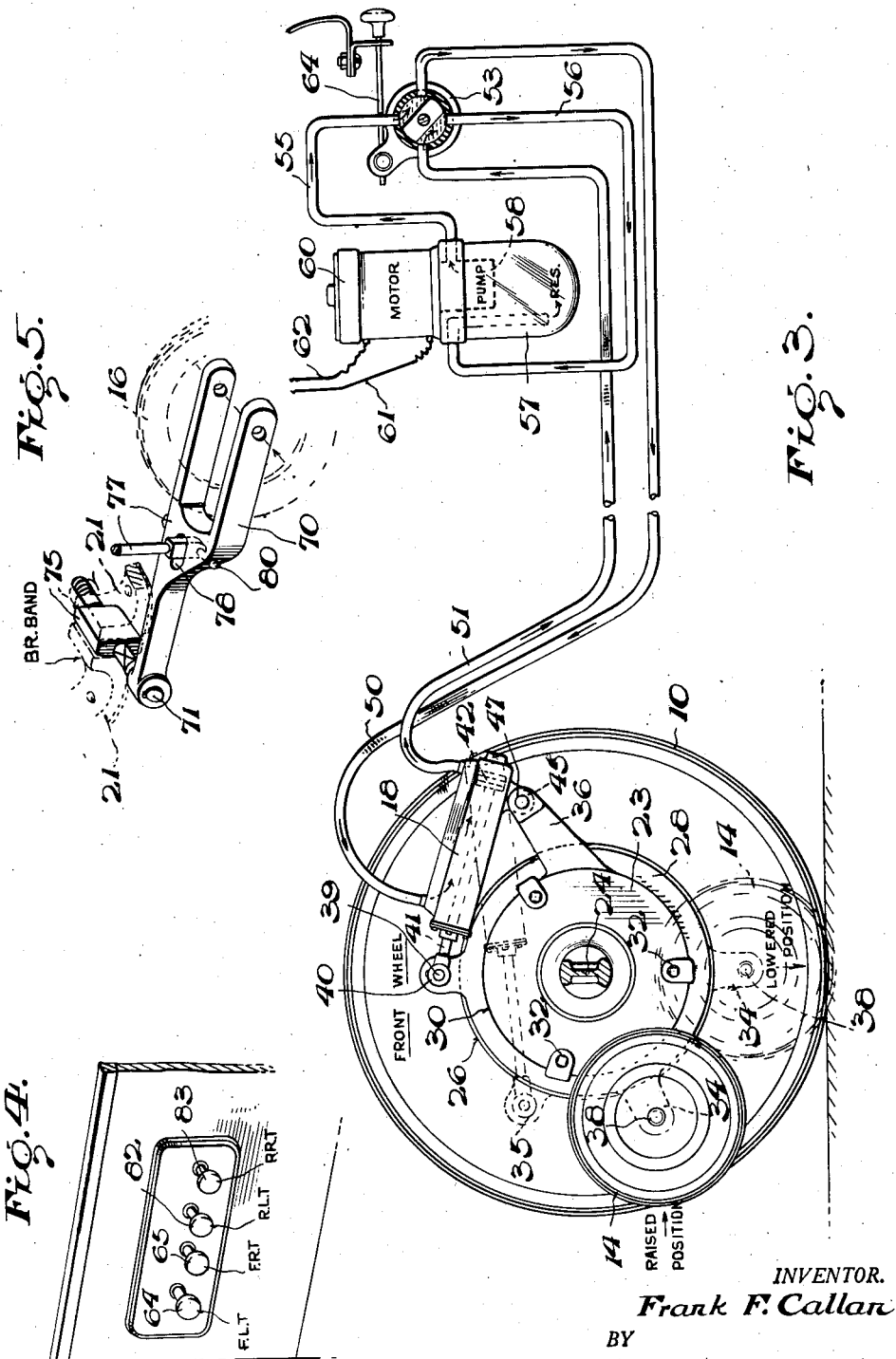

Patented Aug. 9, 1949

2,478,653

UNITED STATES PATENT OFFICE 2,478,653

AUXILIARY WHEEL FOR VEHICLES

Frank F. Callan, Clinton, Tenn.

Application November 10, 1947, Serial No. 785,077

3 Claims. (Cl. 280—150)

1

The present invention relates generally to auxiliary wheels for motor vehicles and more particularly to an auxiliary wheel adapted to be lowered into ground engaging position to support the vehicle in the event that one of the main vehicle wheels becomes incapacitated.

An object of the invention is to provide a novel system of selectively controlled auxiliary jack operated running wheels for each main wheel of a vehicle using pneumatic tires, whereby when the tire on any of the main vehicle wheels becomes deflated the auxiliary wheel for the incapacitated main wheel may be lowered into ground engaging position to support the vehicle while it is driven to a service station or garage for repair.

Another object is to provide in combination with an auxiliary vehicle wheel mounted adjacent a main vehicle wheel, a jack for alternately raising and lowering the said wheels with respect to each other, said jack being operatively connected with the brake of the main rear vehicle wheel, whereby when the jack lowers the auxiliary wheel of one of the rear main wheels to ground engaging position to elevate the main wheel from the ground the brake of the elevated main wheel is automatically applied to prevent rotation thereof while power is supplied by the other rear wheel to drive the vehicle to a repair station.

A further object is to provide in a vehicle having auxiliary operatively associated running wheels for each main wheel, a dashboard control system for selectively alternately raising and lowering one of the main wheels of a vehicle with respect to its operatively associated auxiliary running wheel.

Still a further object is to provide a novel arrangement for pivotally mounting auxiliary vehicle attached wheels on the brake shoe supports of the main vehicle wheels, whereby the auxiliary wheels are effectively and efficiently made a necessary part of the permanent equipment of the vehicle.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention.

In the drawings wherein like reference characters refer to like parts throughout the several views:

2

Figure 1 is a side elevation of an automobile generally showing the auxiliary wheels raised and the various positions of the selective controls and hydraulic pump system for raising and lowering the auxiliary wheels as needed.

Figure 2 is a detail of one of the rear main wheels with its associated auxiliary wheel shown in solid lines to denote the down or lowered position of the auxiliary wheel and in dotted lines to denote the up or raised position thereof with the hydraulic actuating connections.

Figure 3 is an elevational detail view of one of the front wheels with its associated auxiliary wheel shown in solid lines to denote the down or lowered position of the auxiliary wheel and in dotted lines to denote the up or raised position thereof with the hydraulic actuating connections.

Figure 4 is a front view of part of the vehicle dashboard showing the selective control valve levers for the front and rear tires of the wheels.

Figure 5 is an isometric view of the rear auxiliary wheel mounting fork and its brake operating connection.

Referring in detail to the drawing first with reference to Figure 1, there is illustrated an automobile A. This automobile includes the usual four main wheels having two front tires 10 and two rear tires 11. Mounted on the brake housings of each of the front and rear main wheels are rubber covered or tired auxiliary wheels 14 and 16, respectively.

These auxiliary wheels are movable to and from ground engaging position by suitable power means, such as by servo cylinders 18 at the front or servo cylinders 19 at the rear. The front auxiliary wheels 14 are preferably mounted differently from the rear auxiliary wheels 16 for the reason that the rear auxiliary wheels are arranged to apply the main wheel brakes 21 when lowered to ground engaging position. Each brake housing is of the usual conventional construction, for example the front brake housing shown in Figure 3, comprises a brake shoe mounting plate 23 keyed to the axle 24, while the brake drum 26 is carried to rotate with the main vehicle wheel 10. Each of the front auxiliary wheels 14 are mounted on the brake shoe mounting plate 23 by means of an annular ring 28.

The front auxiliary wheel mounting ring 28 is mounted on the circumferential peripheral edge 30 of the brake shoe plate 23 by overlapping lugs 32, so that the inner bore of the ring interfits between the opposite peripheral face of the plate 23 and the rim of the brake drum 26. Thus this ring 28 can be rotated over the peripheral edge of the brake shoe plate 23 by the servo-cylinder 18 as hereinafter explained. Formed from the outer peripheral edge of the ring 28 are apertured ears 34 and 35. The ear 34 carries a stub axle 38 on which is journalled the auxiliary wheel 14 and the ear 35 carries a pin 39 on which is journalled the bearing 40 of a piston rod 41 connected to a piston 42 extending into the servo-cylinder 18. This cylinder is formed with an apertured lug 45 to thereby pivotally connect with an apertured ear 36 by a pin 47, which ear 36 is formed from the edge of the fixed brake shoe plate 23.

The cylinder 18 for the sake of demonstration is connected at each end with fluid feed conduits 50 and 51 leading from a master control cylinder 53 and valve 54. The master cylinder is in turn connected by pressure supply and return conduits 55 and 56 to the reservoir 57 of a hydraulic pump 58. This pump may be driven by an electric motor 60, which is connected from the vehicle's battery, not shown, through leads 61 and 62 to a switch control 64 mounted inside the vehicle, see Figure 1. Each of the front auxiliary wheels 14 are selectively controlled by levers 64 and 65, as illustrated with lever 64, in Figure 3, to thereby control the supply of fluid to the conduits 50 and 51 and the servo-cylinder or jack cylinder 18 from the master cylinder 53.

Each of the front auxiliary wheel mountings and fluid actuating means are identical; but the rear auxiliary wheel mountings are different, and also the specific mounting of the servo-cylinders 19 of each rear wheel. However, as the pump mechanism and feed lines to the rear servo-cylinders 19 are identical, they are given the same reference numerals throughout with the exception of the supply conduits 65 and 66 connecting from the master cylinder 53 to the servo-cylinder 19.

Each rear auxiliary wheel 16 is mounted to revolve in a forked lever 70 keyed on a shaft 71 pivotally mounted in a brake shoe mounting plate 73, see Figures 2 and 5. The shaft 71 is formed with a cam 75 for expanding or spreading the brake shoes 21 when the auxiliary wheel 16 is lowered to ground engaging position by the servo-cylinder 19, supported by the apertured ear 76 on mounting plate 73 by a pin 67 carried by the said cylinder.

The wheel fork lever 70 is formed with an intermediate enlarged section 77 having a flat surface with an elongated opening 78 therethrough. Across the opening is a pin 80 on which is pivotally connected the end of a piston rod 81, the upper end of which carries a piston 83' movable inside of the servo-cylinder 19 by fluid pressure from lines or conduits 65 and 66.

Operation

In all general respects the hydraulic or fluid actuating means is the same in structure and operation for both the front and rear auxiliary wheels. The chief difference is that the rear auxiliary wheels are arranged on the levers 70 which apply the main brakes 21 when the auxiliary wheels are lowered. Accordingly, a description of the operation of one of the rear auxiliary wheels only is considered sufficient for a complete understanding of both the front and back wheel operation.

For example, assume one of the rear tires 11 is flat. All that is necessary to raise the tire from the ground is to close the electric circuit 61—62 to the motor by switch 64 to operate the pump 58. Next a selective control lever 82 or 83 on the dashboard is pulled out from the dotted position shown in Figure 2, and the fluid supplied by the pump flows through conduit 65 from master cylinder 53 to the top end of servo-cylinder 19. The fluid enters the cylinder 19 back of the piston 83', whereby the rod 81 moves to lower the auxiliary wheel 16 to the ground and raises the flat main tire 11 from the ground.

Simultaneously with the lowering of the auxiliary wheel, the lever 70 turns shaft 71 and its operatively associated cam 75 expands the brake shoes 21 to lock the main wheel against rotation. This will permit the remaining good rear tire to still serve as a traction or drive means for the vehicle, so that it can be driven under its own power on the auxiliary wheel 16 and its remaining three good wheels to a repair station. Without this simultaneous brake action the rear elevated wheel would spin and cause considerable vibration and noise, such as to make driving impractical.

The front wheels are operated similarly by the fluid control system, which turns the auxiliary wheel carrier ring 28 to raise and lower the front wheels.

Although only one embodiment of the invention has been illustrated and described in detail, it is to be expressly understood that the same is not limited thereto. Various changes may be made in the design and arrangement of the parts illustrated, as will now be apparent to those skilled in the art. For a definition of the invention, reference should be had primarily to the appended claims.

What I claim is:

1. An auxiliary wheel system for power driven vehicles comprising an auxiliary wheel mounted adjacent each main vehicle rear wheel, a brake shoe support plate for each main rear wheel, an auxiliary wheel mounting means pivotally supported on each brake shoe plate, said mounting means including a brake operating member adapted to apply a main vehicle wheel brake when the auxiliary wheel adjacent thereto is lowered to the ground, and automatic power means for selectively lowering the auxiliary wheels to the ground and simultaneously actuating said brake operating member to apply the said brake.

2. An auxiliary wheel system for a vehicle comprising an auxiliary wheel mounted adjacent each one of the vehicle's front and rear main wheels, said auxiliary wheels being pivoted to the brake shoe support plates of each main wheel, each of said auxiliary wheels adjacent the rear main wheels being rotatably mounted on a forked lever, said lever being pivoted on a pin turnably mounted between the brake shoes of the rear main wheel, a cam on said pin, and a fluid operated piston rod connected to the said lever adapted to lower one or the other of said auxiliary wheels to the ground to raise its adjacent main rear wheel from the ground and thereby simultaneously turn the cam to apply the brakes of the raised rear wheel, whereby the remaining rear wheel may be used to provide traction and drive the vehicle under its own power to a repair station.

3. An auxiliary wheel system for a vehicle comprising an auxiliary wheel mounted adjacent each one of the vehicle's front and rear main wheels, said auxiliary wheels being pivoted to the brake shoe support plates of each main wheel, each of said auxiliary wheels adjacent the front main wheels being turnably supported on mounting means mounted on the peripheral edge of the said brake shoe support plate, said mounting means comprising a ring formed with lugs adapted to overlap the edge of the said support plate, an apertured ear formed from said ring in which said auxiliary wheel is journalled, a second apertured ear formed from the ring circumferentially spaced from said first ear, a piston rod connected to said second ear, a third apertured ear formed from the brake support plate and circumferentially spaced from the said second ear for mounting a servo-cylinder from which said piston rod extends, and hydraulic operating means for reciprocating the said piston rod from the cylinder, to thereby turn said ring and said auxiliary wheel to ground engaging position so as to raise an incapacitated adjacent main wheel from the ground on the auxiliary wheel until repaired.

FRANK F. CALLAN.

REFERENCES CITED

The following references are of record in the file of this patent:

UNITED STATES PATENTS

| Number | Name | Date |
|---|---|---|
| 1,743,005 | Resler | Jan. 7, 1930 |
| 1,860,217 | Azopardi | May 24, 1932 |
| 2,126,083 | Bailey | Aug. 8, 1938 |
| 2,167,929 | Johnson | Aug. 1, 1939 |
| 2,460,178 | Kember | Jan. 25, 1949 |

FOREIGN PATENTS

| Number | Country | Date |
|---|---|---|
| 181,139 | Switzerland | Feb. 17, 1936 |